United States Patent [19]

Ishida et al.

[11] Patent Number: 5,297,338

[45] Date of Patent: Mar. 29, 1994

[54] METHOD OF CONNECTING METAL RING GEAR TO METAL BOSS PORTION

[75] Inventors: Kyoso Ishida; Yoshihisa Miwa, both of Hiroshima, Japan

[73] Assignee: Mazda Motor Corporation, Hiroshima, Japan

[21] Appl. No.: 989,651

[22] Filed: Dec. 14, 1992

[30] Foreign Application Priority Data

Jan. 13, 1992 [JP] Japan .................................. 4-3688

[51] Int. Cl.$^5$ .............................................. B21D 53/28
[52] U.S. Cl. .................................................. 29/893.2
[58] Field of Search ................. 29/893.2, 893.3; 72/53

[56] References Cited

U.S. PATENT DOCUMENTS 4,167,864 9/1979 Taipale .................................... 72/53

FOREIGN PATENT DOCUMENTS 61-42445 2/1986 Japan .

Primary Examiner—P. W. Echols
Attorney, Agent, or Firm—Sixbey, Friedman, Leedom & Ferguson

[57] ABSTRACT

The tooth portion of a metal ring gear is subjected to shot peening after the ring gear is mechanically connected to a metal boss portion by plastic deformation of the metal material.

8 Claims, 3 Drawing Sheets

METHOD OF CONNECTING METAL RING GEAR TO METAL BOSS PORTION

BACKGROUND OF THE INVENTION

1. Field of the Invention

This invention relates to a method of connecting a metal ring gear to a boss portion made of metal.

2. Description of the Prior Art boss portion made of metal, e.g., for connecting a ring gear of a differential of an automobile to a differential case, there has been known a method in which the former is mechanically connected to the latter by plastic deformation of the metal material such as plastic flow connection, riveting or the like. For example, there is disclosed, in Japanese Unexamined Patent Publication No. 61(1986)-42445, a method of connecting a ring gear to a differential by plastic flow connection.

When the ring gear is connected to the boss portion by such a method, the parts associated with the ring gear can be reduced in weight, the parts can be manufactured at a lower cost and the manhour required for the assembly of the ring gear can be reduced as compared with a case where the ring gear is connected to the boss portion by use of bolts and nuts.

When the ring gear is manufactured, at least the tooth portion thereof is heat-treated in order to increase the strength and the resistance to wear.

By subjecting the ring gear to surface hardening heat treating such as carburizing or nitriding treatment, residual compression stress is produced in the hardened surface portion, whereby fatigue properties to repeated loading is improved as well as resistance to wear.

Further there has been known the fact that, by shot peening, scale on the surface of the member can be removed and the surface profile can be improved and at the same time, residual compression surface can be produced in the surface portion of the member.

However the method in which the ring gear is mechanically connected to the boss portion by plastic deformation of the metal material gives rise to a problem that an internal pressure acts on the ring gear in response to plastic deformation of the metal material and a tensile stress acts on the root of the tooth portion in the circumferential direction of the gear, which adversely affects fatigue life of the gear.

That is, even in the ring gear which has been subjected to the surface hardening heat treating, the tensile stress which acts on the root of the tooth portion as a result of connection of the ring gear to the boss portion reduces the residual compression surface in the surface portion and accordingly a desired fatigue life cannot be stably obtained.

Further the method of connecting the ring gear to the boss portion can produce deformation in the tooth portion of the ring gear and deteriorate precision of the gear, which adversely affects mesh of the gears and causes noise.

SUMMARY OF THE INVENTION

In view of the foregoing observations and description, the primary object of the present invention is to provide a method of connecting a metal ring gear to a boss portion made of metal in which the ring gear can be mechanically connected to the boss portion by plastic deformation of the metal material without deterioration in the fatigue life of the tooth portion of the ring gear and the precision of the same.

The method of the present invention is characterized in that the tooth portion of the ring gear is subjected to shot peening after the ring gear is mechanically connected to the boss portion by plastic deformation of the metal material.

In accordance with the method of the present invention, residual compression stress can be produced in the root of the tooth portion of the ring gear by shot peening after connection of the ring gear to the boss portion, whereby the fatigue life of the ring gear can be improved.

In a preferred embodiment of the present invention, the tooth portion of the ring gear is subjected to ground finish before the shot peening after the ring gear is connected to the boss portion.

In this embodiment, since the tooth portion of the ring gear is subjected to ground finish after connection of the ring gear to the boss portion, deformation in the tooth portion of the ring gear produced in response to mechanical connection of the ring gear to the boss portion can be corrected, and precision of the ring gear can be ensured.

DESCRIPTION OF THE PREFERRED EMBODIMENT

Now an embodiment of the present invention where the method of the present invention is applied to assembly of a ring gear to a differential case will be described with reference to the drawings, hereinbelow.

Figure 1:
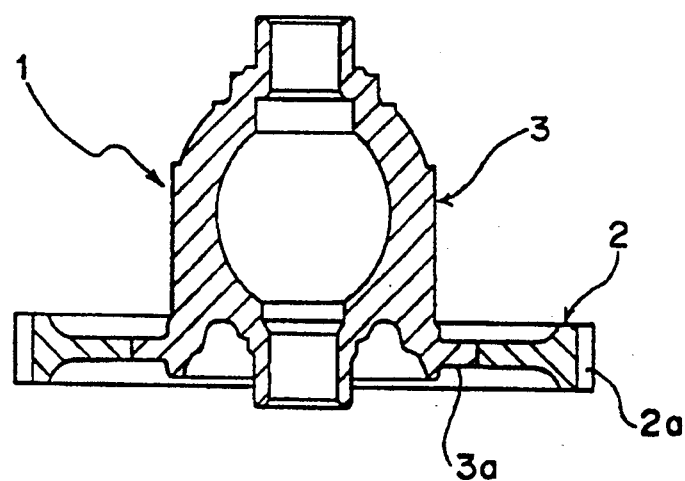
FIG. 1 is a vertical cross-sectional view of a ring gear and a differential case.

In FIG. 1, a differential 1 includes a ring gear 2 and a differential case 3. The ring gear 2 is provided with a tooth portion 2a on the outer peripheral surface thereof and is fitted on and connected to a collar portion 3a formed on one end of the differential case 3.

EXAMPLE

Figure 4:
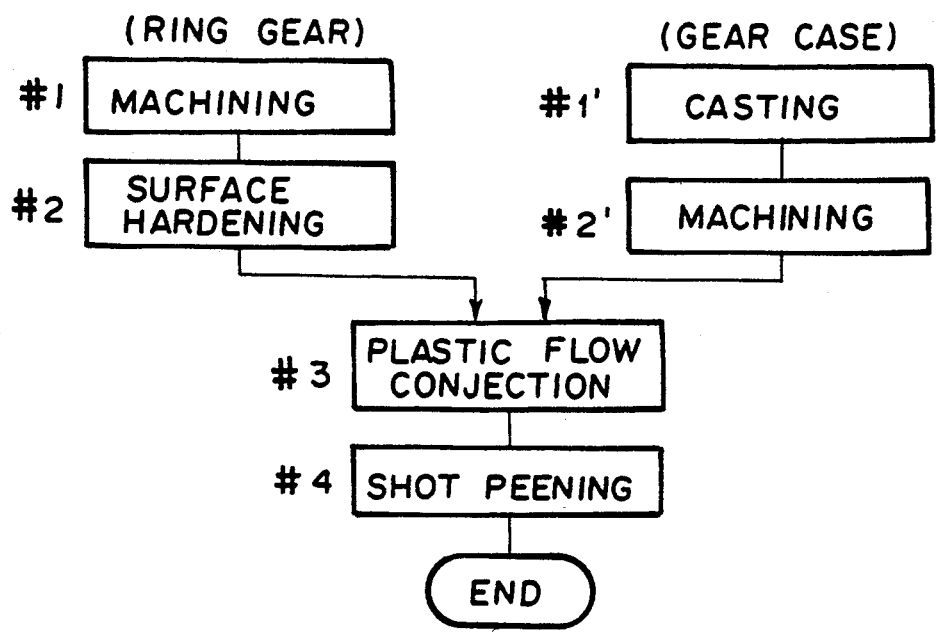
FIG. 4 is a flow chart for illustrating the procedure of connecting the metal ring gear to the boss portion in accordance the method of the present invention.

A ring gear 2 and a differential case 3 such as shown in FIG. 1 were prepared and the former is connected to the latter by the method of the present invention as shown in FIG. 4.

As shown in FIG. 4, a differential case blank was cast into a predetermined shape from spherical graphite cast iron (FCD45 specified in JIS G 5502) (step #1') and the blank was machined to a predetermined size (step #2'), thereby obtaining a differential case 3. A gear blank of case hardening chrome steel (SCr420 specified in JIS G 4104) was machined to a predetermined shape and a predetermined size (step #1) and the tooth portion 2a of the blank was subjected to surface hardening heat treatment, thereby obtaining a ring gear 2. The ring gear 2 may be preformed, for instance, by forging, prior to the machining.

In this embodiment, the tooth portion 2a of the blank was subjected to carburizing and hardening (as the surface hardening heat treatment) and then was tempered.

Figure 5:
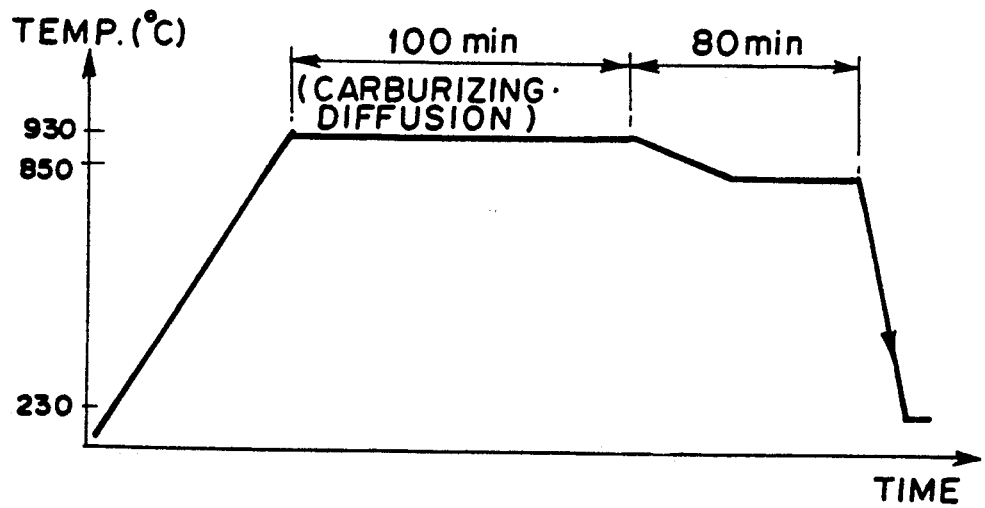
FIG. 5 is a view showing an example of carburizing of the ring gear.
Figure 6:
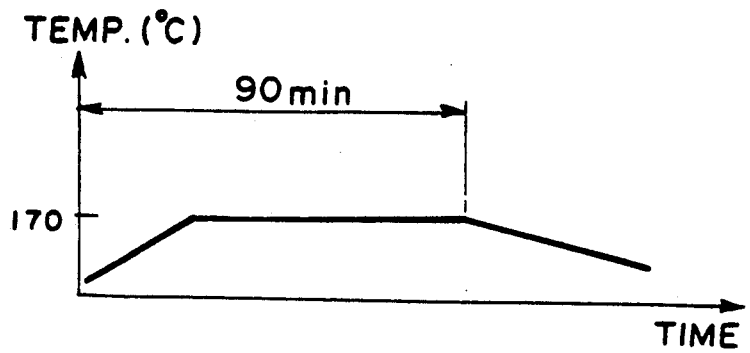
FIG. 6 is a view showing an example of tempering of the ring gear.

The carburizing and hardening were effected in the manner shown in FIG. 5 and the tempering was effected in the manner shown in FIG. 6.

As shown in FIG. 5, the gear blank was heated to a temperature in the range of 900° C. to 950° C. (930° C. in this particular embodiment) and kept at the temperature for 1.5 to 4 hours (100 minutes in this particular embodiment), whereby the gear blank was subjected to carburizing and diffusing. Thereafter the gear blank was cooled to 850° C. and kept at the temperature for a predetermined time. In this particular embodiment, the time from completion of the diffusion to the end of the period during which the gear blank was kept at the temperature was 80 minutes.

Then hardening was effected by dipping the gear blank in a salt bath at 200° C. to 250° C. (230° C. in this particular embodiment) for a predetermined time (5 minutes in this particular embodiment).

Thereafter the tempering was effected by keeping the gear blank at 130° C. to 170° C. (170° C. in this particular embodiment) for 1 to 2 hours (90 minutes in this particular embodiment) and then air-cooling it.

Residual compression stress produced in the root of the tooth portion 2a of the ring gear 2 after the surface hardening heat treatment was measured after the surface hardening heat treatment. The residual compression stress was −250Mpa (megapascal) and was sufficient for the service condition of the ring gear 2.

The tooth portion 2a of the ring gear 2 may be subjected to surface hardening heat treatment such as nitriding and hardening other than carburizing and hardening.

The ring gear 2 thus obtained was connected to the differential case 3. (step #3) In this embodiment, they were connected together by plastic flow connection by pressing the differential case side.

The plastic flow connection will be described, hereinbelow.

Figure 3:
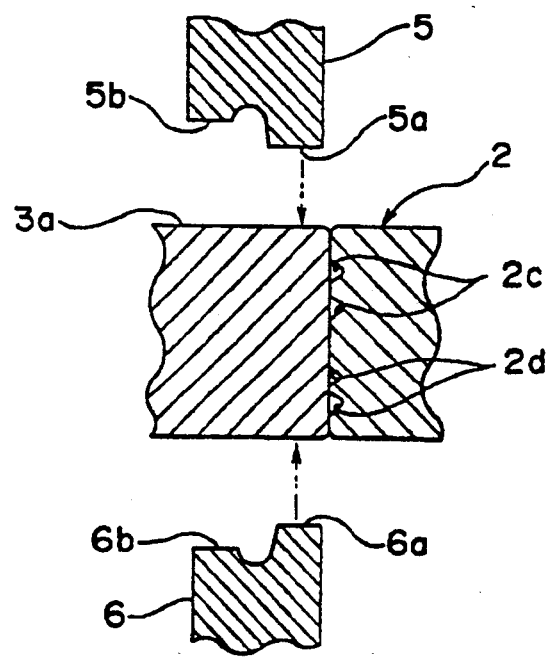
FIG. 3 is a schematic view showing the connection of the ring gear and the differential case before plastic flow connection.

The ring gear 2 is press-fitted on the collar portion 3a of the differential case 3. As shown in FIG. 3, the ring gear 2 is provided with annular grooves on the mating surface (the inner peripheral surface) thereof, two (2c) in the upper portion of the mating surface and the other two in the lower portion of the same.

A pair of punches 5 and 6 are disposed above and below the collar portion 3a of the differential case 3. The punches 5 and 6 respectively have punch portions 5a and 6a which are pressed into the collar portion 3a from above and below. The punches 5 and 6 are further provided with stopper surfaces 5b and 6b which respectively abut against the upper and lower surfaces of the differential case 3 to limit the amount by which the punch portions 5a and 6a are pressed into the collar portion 3a.

Preferably, the punch portion 6a of the lower punch 5 has a pressing area smaller than that of the punch portion 5a of the upper punch 6 so that the lower punch portion 6a is pressed into the collar portion 3a preferentially to the upper punch portion 5a and the lower stopper surface 6b abuts against the differential case 3 earlier than the upper stopper surface 5b and supports the lower side of the differential case 3, whereby deformation of the differential case 3 and/or the ring gear 2 can be prevented.

More preferably, the volume of the lower annular grooves 2d is smaller than that of the upper annular grooves 2c to conform to the difference between the pressing areas of the upper and lower punch portions 5a 15, and 6a so that substantially equal extents of plastic flow occur in the upper and lower parts of the differential case 3 when the punch portions 5a and 6a are pressed into the collar portion 3a.

Figure 2:
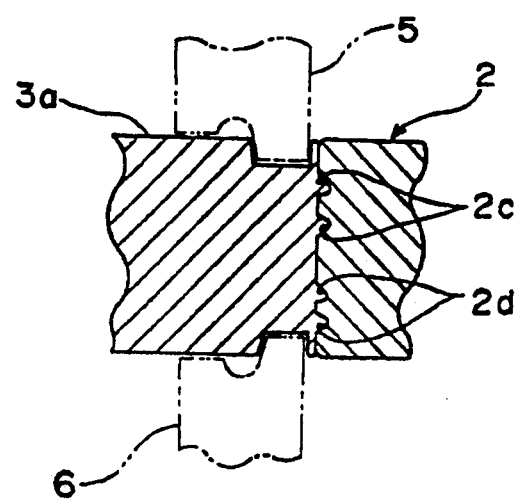
FIG. 2 is a an enlarged fragmentary vertical cross-sectional view of the connection of the ring gear and the differential case.

After the ring gear 2 is press-fitted on the collar portion 3a, the upper and lower punches 5 and 6 are pressed against the collar portion 3a at the vicinity of the mating surface (the outer peripheral surface) thereof so that the punch portions 5a and 6a are pressed into the collar portion 3a, thereby causing plastic flow in the collar portion 3a so that the annular grooves 2a and 2d are filled with spherical graphite cast iron of the differential case 3 as shown in FIG. 2.

After the plastic flow connection, residual compression stress in the root of the tooth portion is reduced to −55MPa.

It is preferred that the tooth portion 2a of the ring gear 2 be subjected, if necessary, to ground finish (so-called hard finish) to remove strain produced by the plastic flow connection, thereby ensuring precision of the tooth portion 2a.

Thereafter, the tooth portion 2a of the ring gear was subjected to shot peening (step #4) in order to compensate for the reduction in the residual compression stress and provide a sufficient amount of residual compression stress to the root of the tooth portion 2a.

Figure 7:
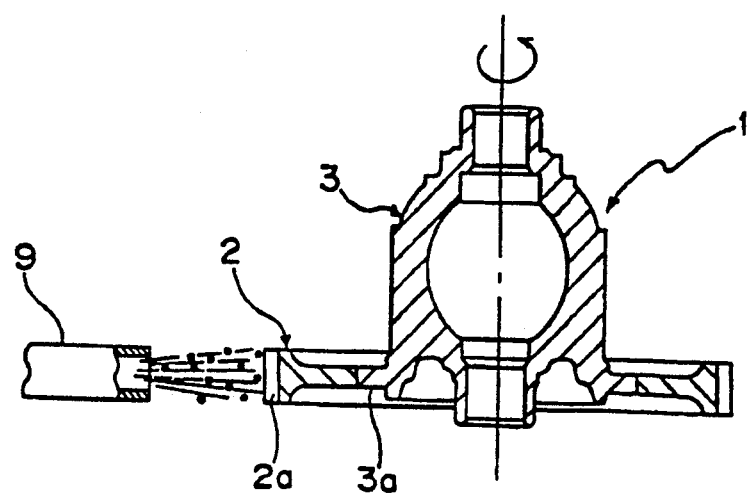
FIG. 7 is a view showing the shot peening of the tooth portion of the ring gear.

That is, as shown in FIG. 7, a shot peening machine 9 was disposed on one side of the ring gear 2 at a predetermined distance from the outer surface of the ring gear 2, and steel balls were caused to impact against the tooth portion 2a of the ring gear 2 while the ring gear 2 was rotated about the central axis of the differential 1.

In the case where the steel balls were injected at 50 to 60m/sec (conventional shot), the residual compression stress in the root of the tooth portion 2a after the shot peening was −310MPa, and in the case where the steel balls were injected at 80 to 100m/sec (hard shot), the residual compression stress in the root of the tooth portion 2a after the shot peening was −760MPa.

As can be understood from the description above, in accordance with this embodiment, the reduction in the residual stress in the root of the tooth portion 2a due to the plastic flow connection of the ring gear 2 and the differential case 3 can be compensated for by effecting shot peening after the plastic flow connection.

Further, by effecting ground finish on the tooth portion 2a of the ring gear 2 after the plastic flow connection, the precision of the tooth portion 2a can be ensured, whereby production of noise during mesh with a mating gear can be suppressed.

Though, in the embodiment described above, the ring gear 2 is connected to the differential case 3 by the plastic flow connection, the fatigue life of the ring tooth portion 2a can deteriorate even if the ring gear 2 is connected to the differential case 3 by other method in which they are mechanically connected by plastic deformation of the metal material. For example, when they are riveted, an internal pressure acts on the ring gear 2 from the rivet hole portion in response to axial compression deformation of the rivet and tensile stress is produced in the root of the tooth portion 2a, which generates strain in the tooth portion and adversely affects the fatigue life of the ring gear 2.

Also in such a case, by providing residual compression stress by shot peening after the connection, the reduction in the residual stress in the root of the tooth portion 2a due to the riveting can be compensated for and sufficient fatigue life can be ensured. Further by effecting ground finish on the tooth portion 2a of the ring gear 2 after the riveting, the precision of the tooth portion 2a can be ensured.

The method of the present invention can be applied to connect various metal ring gears to a boss portion made of metal without limiting to connection of the ring gear and the differential case.

What is claimed is:

1. A method of forming a metal ring gear and boss portion assembly comprising the steps of:
   providing a boss portion of a metal material;
   providing a metal ring gear to be connected to said boss portion;
   mechanically connecting said ring gear to said boss portion by plastic deformation of the metal material; and
   shot peening a tooth portion of said ring gear after said ring gear is mechanically connected to said boss portion.

2. The method as defined in claim 1, further comprising the step of finishing the tooth portion of said ring gear after said ring gear is mechanically connected to said boss portion and prior to the step of shot peening.

3. A method as defined in claim 1 in which the ring gear is connected to the boss portion by plastic flow connection effected by pressing the boss portion.

4. A method as defined in claim 1 in which said boss portion is made of cast iron and said ring gear is made of steel with at least the tooth portion thereof having been subjected to surface hardening heat treatment.

5. A method of forming a differential comprising the steps of:
   providing a differential case of a metal material;
   providing a metal ring gear to be connected to said differential case;
   mechanically connecting said ring gear to said differential case by plastic deformation of the metal material; and
   shot peening a tooth portion of said ring gear after said ring gear is mechanically connected to said differential case.

6. The method as defined in claim 5, further comprising the step of finishing the tooth portion of said ring gear after said ring gear is mechanically connected to said differential case and prior to the step of shot peening.

7. A method of defined in claim 5 in which the ring gear is connected to the differential case by plastic flow connection effected by pressing the differential case.

8. A method as defined in claim 5 in which said differential case is made of cast iron and said ring gear is made of steel with at least the tooth portion thereof having been subjected to surface hardening heat treatment.

* * * * *